(12) United States Patent
Colbert

(10) Patent No.: US 10,941,539 B1
(45) Date of Patent: Mar. 9, 2021

(54) TELESCOPING STABILIZER LEG SYSTEMS AND METHODS

(71) Applicant: Joshua Colbert, Chandler, AZ (US)

(72) Inventor: Joshua Colbert, Chandler, AZ (US)

( * ) Notice: Subject to any disclaimer, the term of this patent is extended or adjusted under 35 U.S.C. 154(b) by 0 days.

(21) Appl. No.: 16/288,227

(22) Filed: Feb. 28, 2019

Related U.S. Application Data

(63) Continuation-in-part of application No. 15/430,618, filed on Feb. 13, 2017, now Pat. No. 10,221,541, which is a continuation of application No. 13/684,127, filed on Nov. 21, 2012, now Pat. No. 9,567,728.

(51) Int. Cl.

| | | |
|---|---|---|
| *B60S 9/12* | (2006.01) | |
| *E02F 3/32* | (2006.01) | |
| *E02F 9/08* | (2006.01) | |
| *E02F 9/22* | (2006.01) | |
| *E02F 3/96* | (2006.01) | |

(52) U.S. Cl.
CPC ............... *E02F 9/085* (2013.01); *B60S 9/12* (2013.01); *E02F 3/32* (2013.01); *E02F 3/964* (2013.01); *E02F 9/2228* (2013.01)

(58) Field of Classification Search
CPC ... E02F 9/085; E02F 3/32; E02F 3/964; E02F 9/2228; B60S 9/12
See application file for complete search history.

(56) References Cited

U.S. PATENT DOCUMENTS

| | | | | |
|---|---|---|---|---|
| 2,452,632 A | * | 11/1948 | McLeod | B62D 57/00 37/397 |
| 3,150,733 A | * | 9/1964 | Goebel | E02F 9/04 180/8.1 |
| 4,416,344 A | * | 11/1983 | Nakada | B66C 23/80 180/199 |
| 9,199,828 B2 | * | 12/2015 | Steinich | B66C 23/78 |
| 2012/0173094 A1 | * | 7/2012 | Steinich | B66C 23/78 701/50 |

* cited by examiner

*Primary Examiner* — Bryan A Evans
(74) *Attorney, Agent, or Firm* — Inspired Idea Solutions, LLC

(57) ABSTRACT

A system to stabilize a construction vehicle is disclosed having a frame and a pair of stabilizer legs with ground-engaging shoes at the ends of the legs. The stabilizer legs may pivotally connect to the frame on substantially opposing sides, so that the stabilizer legs pivot upwards to a stowed position and pivot downwards to a stabilizing position where the shoe engages the ground. The stabilizer legs may telescope between a retracted and extended position. The retracted position locates the shoe closer to the vehicle and the extended position further from the vehicle. A pair of hydraulic cylinders may be connected to the respective stabilizer legs to power the telescopic movement of the stabilizer legs between the retracted position and extended position. A controller may allow substantially lateral movement of the construction vehicle while the pair of stabilizer legs are engaged with the ground to support the construction vehicle.

20 Claims, 9 Drawing Sheets

TELESCOPING STABILIZER LEG SYSTEMS AND METHODS

CROSS REFERENCE TO RELATED APPLICATIONS

This application is related to, and claims priority to, U.S. application Ser. No. 13/684,127 filed on Nov. 21, 2012, issued as U.S. Pat. No. 9,567,728 on Feb. 14, 2017, the contents of which are hereby incorporated by reference; and U.S. application Ser. No. 15/430,618 filed on Feb. 13, 2017 issued as U.S. Pat. No. 10,221,541 on Mar. 5, 2019, the contents of which are hereby incorporated by reference.

BACKGROUND

1. Technical Field

This disclosure relates to construction equipment including vehicles for excavating and particularly backhoes.

BRIEF SUMMARY

A system is disclosed for providing a range of ground positions to position the shoe of an stabilizer leg so that the operator of the construction equipment can select the preferred ground position. This disclosed system may provide lateral movement of construction equipment where the stabilizer legs are in the stabilizing position. The disclosed system may be safe, efficient, trustworthy, inexpensive and handy.

Disclosed is a system to stabilize a construction vehicle having a frame and a pair of stabilizer legs with ground-engaging shoes at the distal ends of the legs. The stabilizer legs may pivotally connect to the frame on substantially opposing sides, so that the stabilizer legs pivot upwards to a stowed position and pivot downwards to a stabilizing position where the shoe engages the ground. Further, the stabilizer legs may telescope between a retracted position and an extended position. The retracted position may locate the shoe closer to the vehicle and the extended position may locate the shoe further from the vehicle. A pair of cylinders may connect to the respective stabilizer legs to power the telescopic movement of the stabilizer legs between the retracted position and extended position. The telescoping legs may telescope while the ground-engaging shoes are on the ground to move the position of the construction vehicle using a telescoping action.

DETAILED DESCRIPTION

The disclosed telescoping stabilizer leg systems will now be discussed in detail with regard to the attached drawing figures, which were briefly described above. In the following description, numerous specific details are set forth illustrating the Applicant's best mode for practicing the telescoping stabilizer leg systems and enabling one of ordinary skill in the art to make and use the telescoping stabilizer leg systems. It will be obvious, however, to one skilled in the art that the disclosed telescoping stabilizer leg systems may be practiced without many of these specific details. In other instances, well-known manufacturing methods, mechanical engineering considerations, electric circuit, hydraulic circuit and/or pneumatic circuit considerations, fluid dynamics principals and other details have not been described in particular detail in order to avoid unnecessarily obscuring this disclosure.

Figure 1:
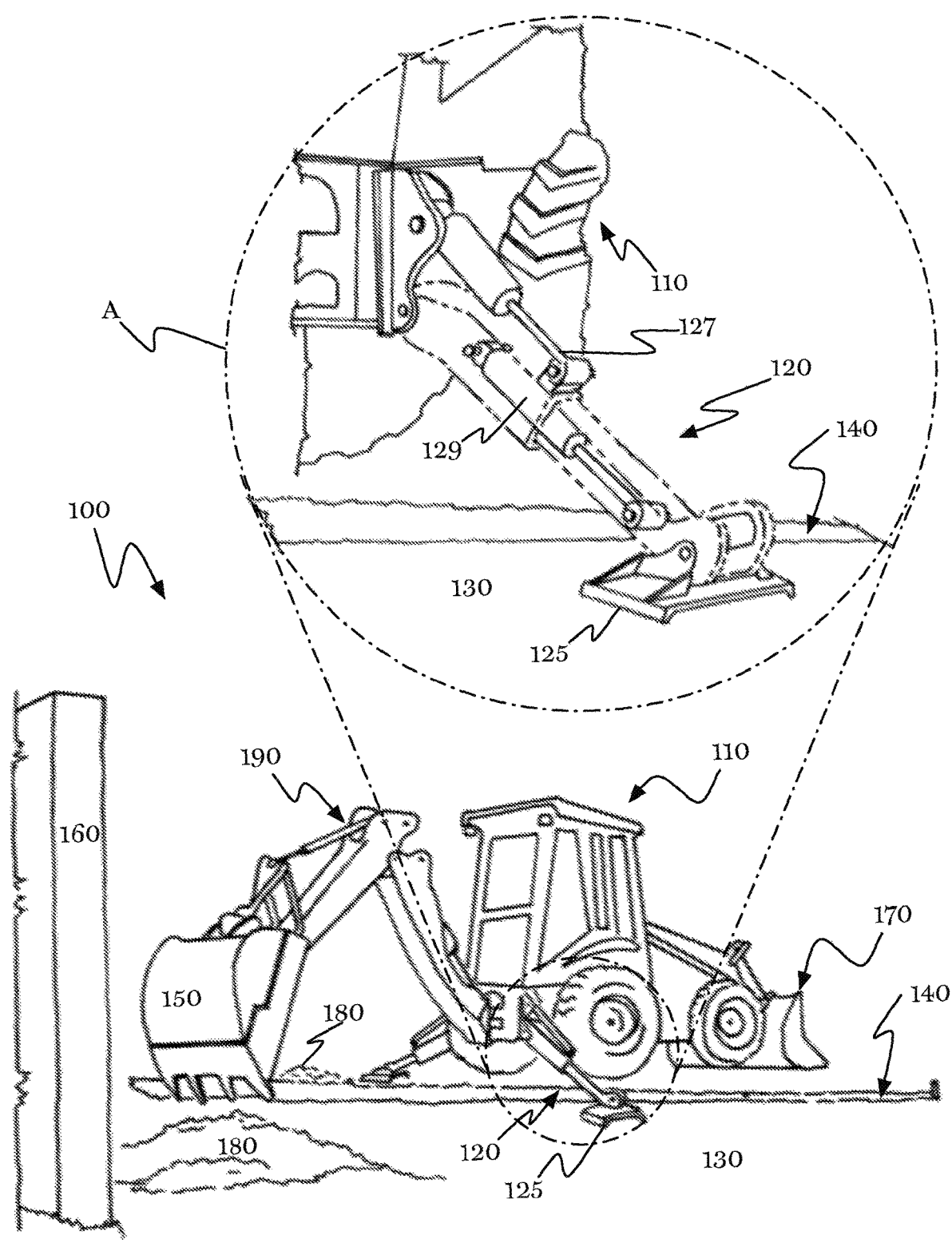
FIG. 1 shows a perspective view that illustrates a backhoe loader with an stabilizer leg engaged with the ground after being extended to a location further from the vehicle.

FIG. 1 shows a perspective view that illustrates construction vehicle 110 such as a backhoe loader, with stabilizer leg 120 that may include a stabilization leg engaged with ground 130 after being extended to a location further from construction vehicle 110 across ditch 140. System 100 shows how stabilizer legs (also known as outriggers) on construction vehicles such as backhoe loaders can extend and retract using hydraulics, pneumatics, and/or electric actuators. That is, system 100 shows how stabilizer legs can telescope their length to provide positioning of shoe 125 across a range of ground locations to permit the operator to place shoe 125 on stable ground. Telescoping stabilizer legs can be helpful when shoe 125 would otherwise be positioned inside or along the edge of the ditch that the backhoe loader digs.

For example, as shown in FIG. 1, construction vehicle 110 uses a first earth moving tool 150 such as a backhoe bucket to dig a ditch 140 in the ground 130 between building 160 and a terminus, (which is not shown), such as the street, or utility connection. It is desirable to dig ditch 140 to extend close to both building 160 and the terminus using construction vehicle 110 (and not digging manually, for example, using shovels). One way to dig ditch 140 using construction vehicle 110 would be to begin digging at the terminus and proceed toward building 160. As the ditch approaches building 160, construction vehicle 110 would be turned around to complete the ditch (and to avoid running into the building) by digging outwardly from the building back toward the ditch 140.

Without telescoping stabilizer legs, backhoe loader would likely place the stabilizer leg inside the ditch (that is, not properly engaged with ground), or, immediately next to the ditch where the ground may not be stable. Without telescoping stabilizer legs, the backhoe loader operator might need to re-position or repeatedly re-position the backhoe loader to avoid an undesirable placement of the stabilizer leg shoe.

Without the telescoping stabilizer legs, the backhoe loader might be required to refill a portion of the ditch in order to effectuate a stable placement of the stabilizer leg.

As shown, construction vehicle 110 could avoid these problems. Construction vehicle 110 shows stabilizer leg 120 extended beyond ditch 140 to place shoe 125 beyond ditch 140. Without extending, stabilizer leg 120 might be placed in ditch 140. This shoe 125 placement relieves the need to reposition backhoe loader 110, which may improve efficiency, for example, because the time spent repositioning the backhoe loader could be saved. This shoe 125 placement relieves the need to partially fill in ditch 140, which may save time and improve safety, for example, because the time spent partially filling in the ditch could be saved and because more stable ground could be selected for placement of the shoe of the stabilizer leg.

By allowing a wider range of placements of the shoe 125, safety can be improved, for example, because a more stable location for placing the shoe 125 may be selected by the operator. The telescoping stabilizer leg maintains many of the existing benefits of backhoe stabilizer legs generally. For example, the stabilizer legs can still be stowed for easy transportation of the backhoe rigger.

Further, when the backhoe loader is used on uneven ground, the use of telescoping stabilizer legs can provide additional positioning of the backhoe loader and placement of the shoe of the stabilizer leg.

As shown in the exploded portion A of FIG. 1, the stabilizer leg 120 can be telescoped (that is, extend or retract along a range of ground positions) and moved between stowed/stabilized positions using cylinders. Stabilizer cylinder 127 moves stabilizer leg 120 between a stowed position and a stabilizing position. Stabilizer cylinder 127 may include a hydraulic stabilizer cylinder, or a pneumatic stabilizer cylinder, or an electric actuator stabilizer cylinder.

Telescoping cylinder 129 is shown positioned inside stabilizer leg 120. Telescoping cylinder 129 may extend or retract the length of stabilizer leg 120, because stabilizer leg 120 has two mating portions that slide along the long axis. Telescoping cylinder 129 may include a hydraulic telescoping cylinder, or a pneumatic telescoping cylinder, or an electric actuator telescoping cylinder.

Construction vehicle 110 has a first earth moving tool 150 for digging and excavating on one end such as a bucket. Construction vehicle 110 has a second earth moving tool 170 on the other end for conveying materials into transportation trucks such as a loader. Construction vehicle 110 prepares for excavation by lowering loader 170 and both of its stabilizer legs 120, as shown, to stabilize the construction vehicle 110 while the first earth moving tool 150 moves, swings, and scoops during excavation. If necessary, stabilizer legs 120 may be telescoped to select a desirable or stable ground position for shoe 125. Construction vehicle 110 excavates by swinging first earth moving tool 150 out to engage the ground by extending the stick and boom 190, and scooping up earth, which can be picked up and placed into piles of dirt 180, as shown.

The construction vehicle 110 may be any suitable mechanical excavator with bucket and hinged boom, such as, the bucket loader (or front-end loader) shown in FIG. 1, as a backhoe loader. Alternately, construction vehicle 110 may be an excavator with features like removable buckets, removable loaders, etc. The stabilizer leg may be any suitable stabilizing beam such as rigger shown in FIG. 1, for stabilizer leg 120. The frame may be any suitable vehicle chassis, such as the body of the backhoe loader shown in FIG. 1. The tractor may be any suitable prime mover, such as the engine enclosed in the backhoe loader shown in in FIG. 1.

The backhoe bucket may be any suitable excavating-scoop such as the shovel-scoop shown in FIG. 1, for first earth moving tool 150. The loader bucket may be any suitable bucket conveyor for loading materials, such as the wide scoop shown in in FIG. 1 as loader 170. The shoe may be any suitable ground-engaging member, such as the friction gripper shown in FIG. 1 for shoe 125. The stick and boom may be any suitable hinged boom, such as the pivoting, two-beam hydraulically controlled boom shown in FIG. 1 as stick and boom 190.

The cylinder may be any suitable linear motor, such as the mechanical actuator that provides a unidirectional force with a unidirectional stroke, shown in FIG. 1 for stabilizer cylinder 127 and telescoping cylinder 129. Stabilizer Cylinder 127 and telescoping cylinder 129 may be hydraulic cylinders, pneumatic cylinders, or electric actuator cylinders.

Figure 2:
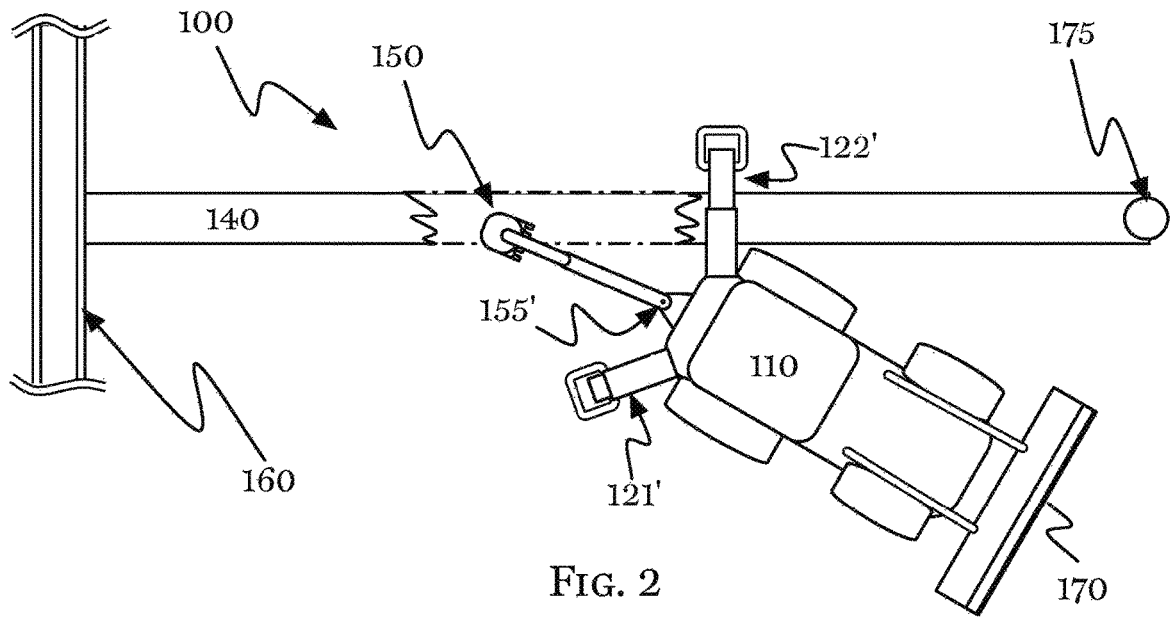
FIG. 2 shows a top, diagrammatic view that illustrates a backhoe loader positioned near a ditch requiring extension of an stabilizer leg to cross the ditch.
Figure 3:
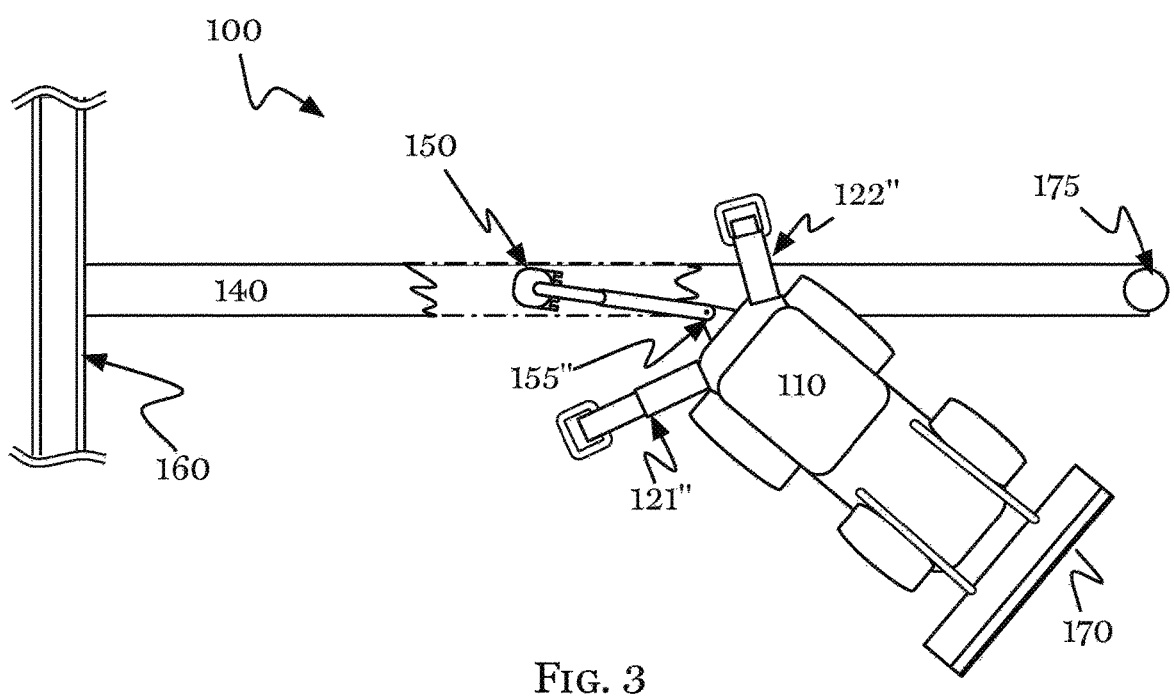
FIG. 3 shows a top, diagrammatic view that illustrates a backhoe loader positioned near a ditch after translating the backhoe over the ditch by retracting the extended stabilizer leg and extending the retracted stabilizer leg.

FIG. 2 shows a top, diagrammatic view that illustrates construction vehicle 110 positioned near ditch 140 requiring extension of an stabilizer leg to cross ditch 140. FIG. 3 shows a top, diagrammatic view that illustrates construction vehicle 110 positioned near ditch after translating the backhoe over ditch 140 by retracting extended stabilizer leg 122 and extending retracted stabilizer leg 121.

Now turning to FIGS. 2 and 3 together, these figures show that the operator of construction vehicle 110 may translate construction vehicle 110 from side to side by simultaneously extending one stabilizer leg and retracting the other stabilizer leg, as shown. FIG. 2 shows stabilizer leg 121' in the retracted position and stabilizer leg 122' in the extended position. In both FIG. 2 and FIG. 3, loader 170 may be lowered to the ground position and is providing a third point of stabilization with the ground. This arrangement may be desirable because it would position the ground engaging end of stabilizer leg 122 beyond ditch 140. Between the positions of the construction vehicle 110 shown in FIG. 2 and FIG. 3, operator would simultaneously extend stabilizer leg 121 and retract stabilizer leg 122. FIG. 3 shows the stabilizer leg 121" in the extended position and stabilizer leg 122" in the retracted position.

The result of the translation of the construction vehicle from the position shown in FIG. 2 to the position shown in FIG. 3 is that backhoe loader has moved predominately sideways, which can be seen by the movement of pivot 155 relative to ditch 140. First earth moving tool 150 such as the bucket may be attached to the stick and boom which is attached to construction vehicle 110 at pivot 155. Pivot 155 allows first earth moving tool 150 to swing from side to side. In FIG. 2, pivot 155' is positioned well to one side of ditch 140, as shown. In FIG. 3, pivot 155" is positioned substantially over top of ditch 140, as shown. Further, FIG. 3 shows that at least a portion of a wheel of the construction vehicle 110 may be positioned over ditch 140, as well. That is, the lateral translation of the construction vehicle 110 may allow the backhoe loader to reach positions and placements that may not be reached by driving on backhoe loader's wheels. This arrangement may have the further advantage of saving time by aligning the in-and-out scooping motion of first earth moving tool 150 (along the hinged stick and boom) with ditch 140, as shown in FIG. 3, which may aid in efficiency of excavation, ease of operation, or provide other advantages.

Loader 170 may rotate over (or slide across) the ground to accommodate the predominately sideways motion of the backhoe loader 110. This can be seen by the change in angle of the loader 170 relative to ditch 140, as shown between FIGS. 2 and 3.

Figure 4:
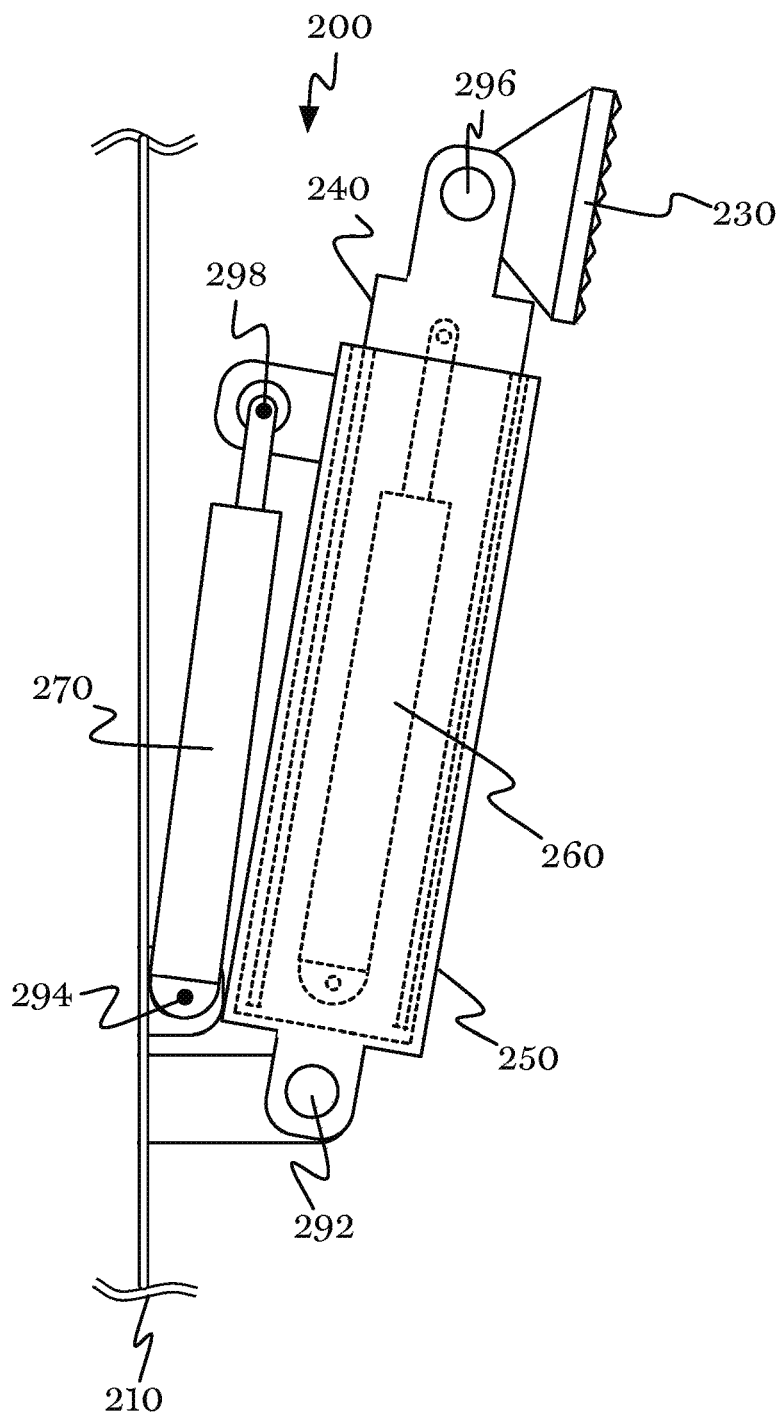
FIG. 4 shows a side view that illustrates the stabilizer leg in the stowed, retracted position.
Figure 5:
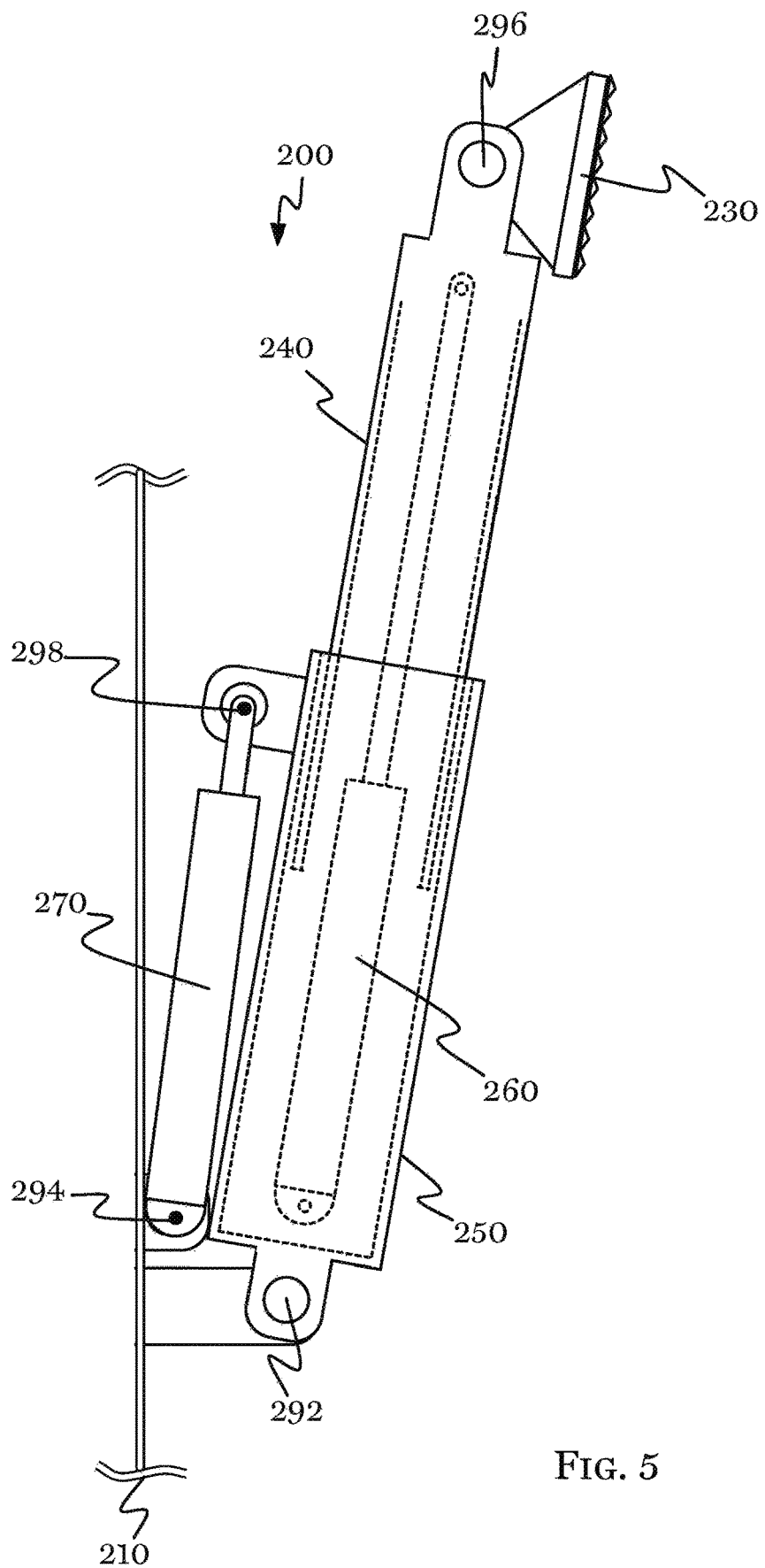
FIG. 5 shows a side view that illustrates the stabilizer leg in the stowed, extended position.
Figure 6:
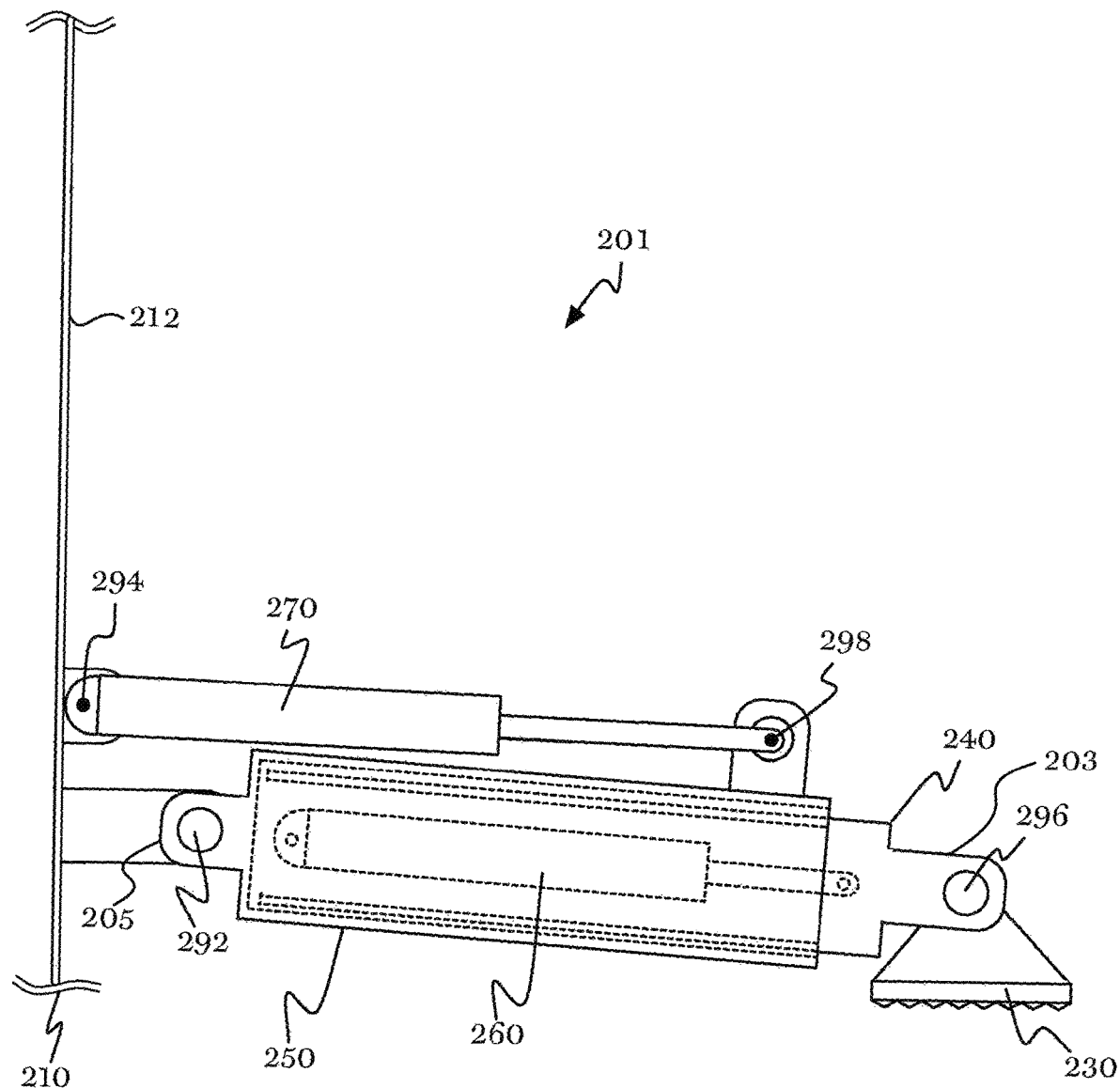
FIG. 6 shows a side view that illustrates the stabilizer legs in the stabilizing, retracted position.
Figure 7:
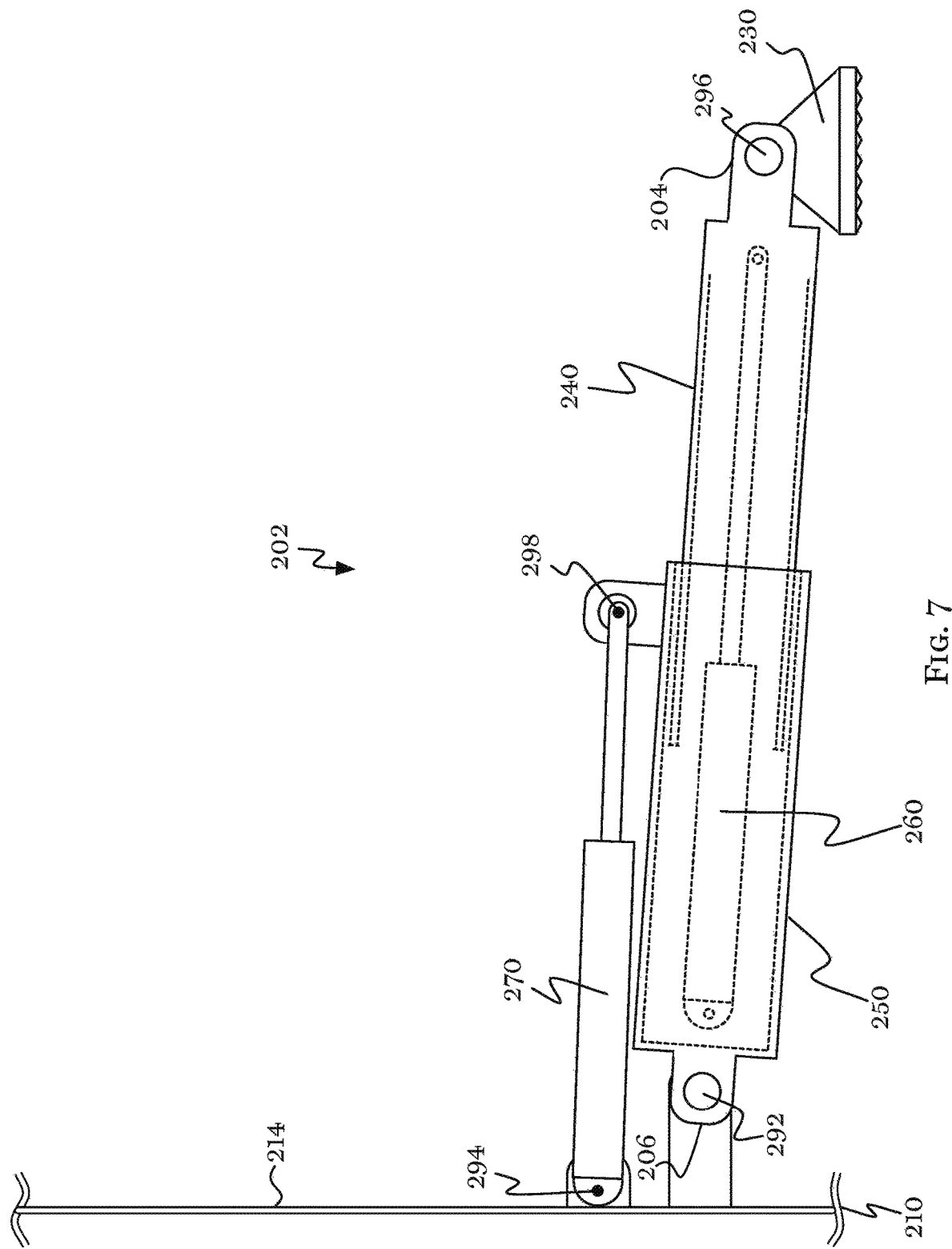
FIG. 7 shows a side view that illustrates the stabilizer leg in the stabilized, extended position.

FIG. 4 shows a side view that illustrates stabilizer leg 200 in the stowed, retracted position. FIG. 5 shows a side view that illustrates stabilizer leg 200 in the stowed, extended position. FIG. 6 shows a side view that illustrates stabilizer leg 200 in the stabilizing, retracted position. FIG. 7 shows a side view that illustrates stabilizer leg 200 in the stabilized, extended position. In an example embodiment, FIG. 6 shows a right side stabilizer leg attached to the right side 212 of the frame 210, and FIG. 7 shows a left side stabilizer leg attached to the left side 214 of the frame 210.

Now, considering FIGS. 4, 5, 6, and 7 together, the various extreme (that is, fully-extended or fully-contracted) positions of stabilizer leg 200 can be seen. Stabilizer leg 200 connects to frame 210, as shown. The medial end of stabilizer leg 200 pivotally connects to frame 210 at joint 292, as shown. The medial end of hydraulic cylinder 270 pivotally connects to frame 210 at joint 294, as shown. The distal end of hydraulic cylinder 270 pivotally connects to stabilizer leg 200 at joint 298, as shown. This arrangement of joints 292, 294, and 298 with stabilizer leg 200 and hydraulic cylinder 270 allows stabilizer leg 200 to rotate between a stowage position and a stabilization position. These pivoting connections may be made by pins.

Stabilizer leg 200 pivotally connects to shoe 230 at the leg distal end through joint 296, as shown, which allows shoe 230 to engage the ground at a varying angle. This pivoting connection may be made by a pin. Alternately, the shoe may be fixedly connected to the stabilizer leg.

Stabilizer leg 200 includes external member 250 and internal member 240, as shown. External member 250 may be disposed around internal member 240 to allow internal member to slide in and out along the long axis. Hydraulic cylinder 260 may be disposed inside of internal member 240 and fixedly connected to the distal end, as shown. Hydraulic cylinder 260 may be disposed inside of external member 250 and fixedly connected to the medial end, as shown. The example arrangement of external member 250, internal member 240 and hydraulic cylinder 260 allows stabilizer leg 200 to extend and retract, that is, it allows telescoping along the long axis of stabilizer leg 200. The external member 250, internal member 240 and hydraulic cylinder 260 may be designed to be sufficient to overcome the forces generated during swinging, scooping and otherwise operating the earth moving tool, for example the bucket on the stick and boom, selection of the materials and design may include factors such as modeling of mechanical forces, advances in materials technology, advances in hydraulics or fluid dynamics, economic considerations, etc.

The beams may be any type of slidably-mating beams, such as the mating cylinders shown in FIGS. 4, 5, 6, and for external member 250 and internal member 240. Alternately, the external member and internal member may be reversed, with the internal member connected to the frame and the external member connected to the shoe. Further alternately, the hydraulic cylinder may be disposed along the outside of the stabilizer leg. Yet further alternately, the members may be inter-mating in any fashion that allows sliding or extension/contraction along the long axis. In some embodiments, the joint between the stowage/stabilization cylinder and the stabilizer leg may be desirable on the portion/beam/member that is immediately pivotally connected to the frame.

FIG. 6 shows an example right side 212 of frame 210 and a right side stabilizer leg 201 connected to right side 212 of frame 210. Right side stabilizer leg 201 may include right side stabilizer end 203 which may be connected to a shoe 230 or other ground engaging device.

FIG. 7 shows an example left side 214 of frame 210 and a left side stabilizer leg 202 connected to left side 214 of frame 210. Left side stabilizer leg 202 may include left side stabilizer end 204 which may be connected to a shoe 230 or other ground engaging device.

Figure 8:
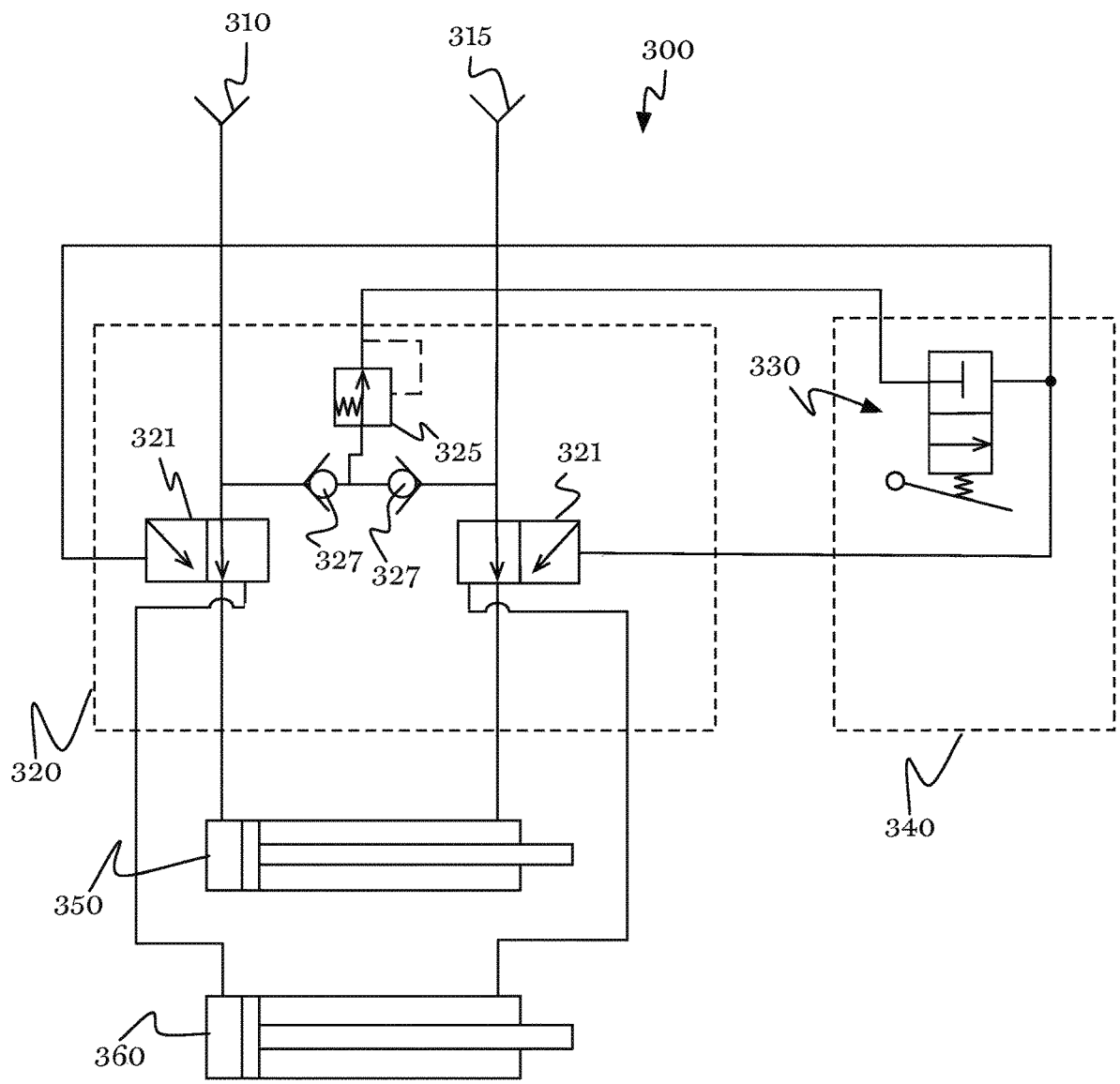
FIG. 8 shows a schematic view that illustrates a hydraulic circuit to retrofit pre-existing construction equipment with the telescoping stabilizer leg.

FIG. 8 shows a schematic view that illustrates hydraulic circuit 300 to retrofit pre-existing construction equipment with a pair of telescoping stabilizer legs. For pre-existing construction equipment, a kit may be provided to retrofit with telescoping stabilizer legs. This kit may include two telescoping stabilizer legs, of the type shown in FIGS. 4, 5, 6, and 7. The kit may include sufficient controls to operate the two new hydraulic cylinders, that is, control valve, lines, and manual valves for the placement in cab. The kit may include installation instructions (to describe the installation steps) and an operating manual (to describe operation of the telescoping stabilizer leg after installation).

In some embodiments a circuit may be provided including pneumatic or electric circuits to retrofit pre-existing construction equipment with a pair of telescoping stabilizer legs. For pre-existing construction equipment, a kit may be provided to retrofit with telescoping stabilizer legs. This kit may include two telescoping stabilizer legs. The kit may include sufficient controls to operate the two new electric or pneumatic cylinders, that is, control valve, lines, and manual valves for the placement in cab, or electric wires, relays and electric switches. The kit may include installation instructions (to describe the installation steps) and an operating manual (to describe operation of the telescoping stabilizer leg after installation).

A kit may be sold as an aftermarket solution. Kits may be assembled using parts with appropriate dimensions for the make, model, and/or year of construction equipment. The stabilizer leg may mount to the pre-existing machine frame pin bores. The stabilizer leg arm may house a separate control valve, which would allow the telescoping circuit to be operated by the pre-existing stow/stabilize hydraulic circuit.

Installation may begin by removal of the original (non-telescoping) stabilizer leg. The hydraulic cylinder (for stow/stabilize hydraulic circuit) may be left attached to the construction equipment. The new telescoping stabilizer leg may be attached to the frame of the construction equipment, which includes a hydraulic cylinder for extend/retract hydraulic circuit. The extend/retract cylinder may be connected to the existing hydraulic circuit by modifying the circuit to function as shown in FIG. 8.

FIG. 8 shows a hydraulic circuit that permits use of the existing (stow/stabilize) hydraulic controls to alternate between controlling the pair of hydraulic cylinders that stow/stabilize and controlling the pair of hydraulic cylinders that extend/retract (telescope). The original hydraulic lines from head end 310 and rod end 315 of the stow/stabilize hydraulic circuit may be connected into the diverter valve 320, which may be the diverter valve provided with the telescoping stabilizer leg as part of a kit.

Hydraulic oil may flow into diverter valve 320 from the head end 310 and rod end 315, as shown. Diverter valve 320 may contain control spools 321, double check valves 327, and pressure reducing valve 325, as shown. Upon activation of the hydraulic circuit, pilot oil can be produced through pressure reducing valve 325, as shown. Pilot oil may flow to control valves 330 located in cab 340.

Hydraulic fluid may be any suitable incompressible fluid, such as hydraulic oil. Control valves 330 are detented. When control valves 330 are in a normal position, control valves 330 would block oil and allow only operation of the stow/ stabilize hydraulic circuit of the stow/stabilize hydraulic cylinder 350. This allows moving the telescoping stabilizer leg between the stowed position and the stabilizing position.

In an example controller, when the operator would like to operate the telescoping hydraulic circuit, the operator would change the position of the detented control valves 330. The pilot oil from the control valves 330 would then travel back to diverter valve 320 allowing the position of spools 321 to re-direct the pump flow to the extend/retract hydraulic circuit of the telescoping cylinder 360.

In some embodiments, diverter valve 320 may be mounted within or upon the telescoping stabilizer leg. In some embodiments, it may be preferable to provide quad check valves or multiple check valves to prevent movement of the stow/stabilize cylinder while the extend/retract hydraulic circuit is in use.

The hydraulic controller may be any suitable mechanical, pilot, or electro-hydraulic controls, such as the diverter valves shown in FIG. 8 as diverter valve 320.

For installations into new construction equipment, the original equipment manufacturer may include a control circuit as part of the original construction equipment. This control circuit would be operated from the cab by the operator and allow extension and retraction of the telescoping stabilizer legs, either independently, or simultaneous (as desirable to create side-to-side movement described in FIGS. 2 and 3, above). These controls may be mechanical, pilot, or electro-hydraulic controls, or other types of controls.

The control circuit may include a pneumatic control circuit with the same or similar control valves and features, for controlling a pneumatic cylinder such as a pneumatic piston or other actuator. In some embodiments a control circuit may include an electric circuit to control an electric actuator cylinder. An electric control circuit may use known methods of driving electric motors and actuators.

Figure 9:
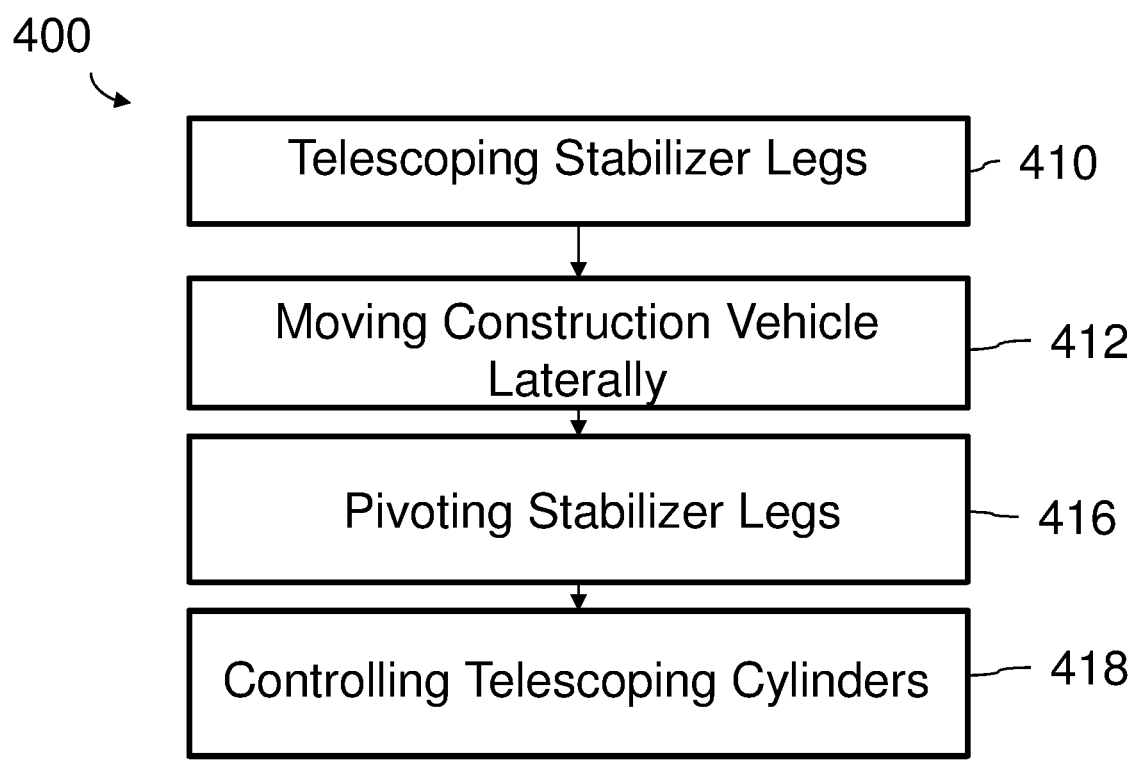
FIG. 9 show an example method of operating construction equipment.

FIG. 9 shows an example method of operating 400 a construction vehicle. The construction vehicle may include a frame 210 an earth moving tool 150 a pair of stabilizer legs 120 having leg distal ends, a pair of telescoping cylinders 129 connected to the pair of stabilizer legs 120 and a controller attached to the construction vehicle. The method 400 may include the steps of telescoping the pair of stabilizer legs 410 by the controller, using the pair of telescoping cylinders 129 between a retracted position and an extended position; and moving the construction vehicle laterally 412, by the controller, while the leg distal ends of the pair of stabilizer legs are engaged with the ground.

In some embodiments the pair of stabilizer legs may include leg pivot ends connected to the frame. The method 400 may include pivoting the pair of stabilizer legs 416, by the controller, between a stowed position and a stabilizing position. The step of pivoting the pair of stabilizer legs may include pivoting the pair of stabilizer legs, by the controller, to the stowed position by retracting the pair of stabilizer cylinders such that the pair of stabilizer legs pivot upwards close to the construction vehicle; and pivoting the pair of stabilizer legs, by the controller, to the stabilizer position by extending the pair of stabilizer cylinders such that the leg distal ends engage the ground.

The method 400 may include controlling the pair of telescoping cylinders 418, by the controller, by extending and retracting one of the pair of telescoping cylinders independently of the other of the pair of telescoping cylinders.

Prior to operating a construction vehicle, a user may connect a right side stabilizer leg to the right side of the frame 212; connect a left side stabilizer leg to the left side of the frame 214, and engage the ground with the right side stabilizer end and with the left side stabilizer end.

Figure 10:
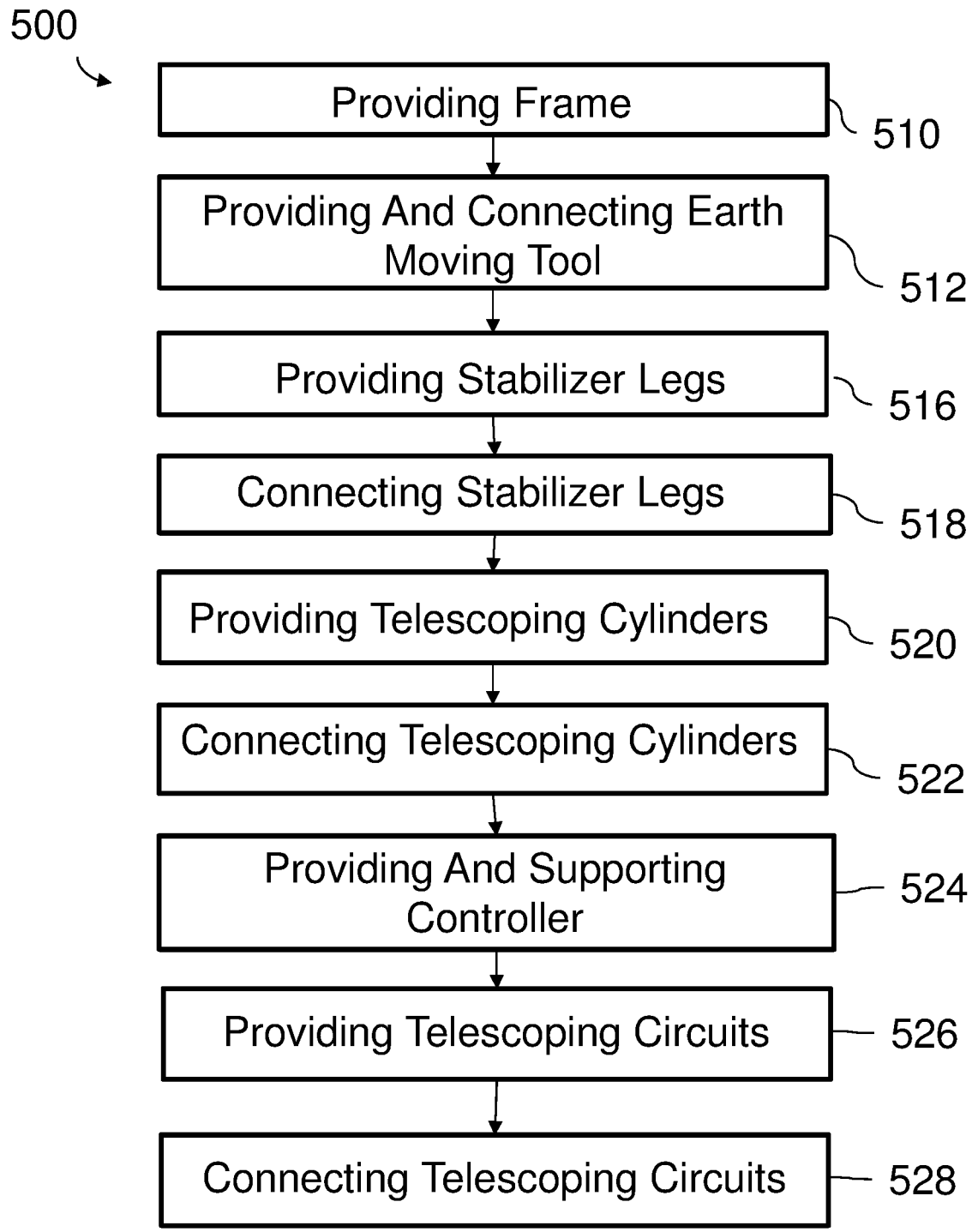
FIG. 10 shows and example method of assembling construction equipment.

FIG. 10 shows an example method of assembling a construction vehicle 500. The method 500 may include providing a frame 510 for the construction vehicle and providing and connecting an earth moving tool 512 for the construction vehicle. Earth moving tools may be backhoe buckets, loader buckets, or other earth moving tools connected to the frame of a construction vehicle. The method 500 may also include providing stabilizer legs 516 including providing a first stabilizer leg having a first leg distal end and providing a second stabilizer leg having a second leg distal end. The distal ends may include right side stabilizer end 203 and left side stabilizer end 204 as shown by way of example in FIGS. 6 and 7. The method may include connecting the stabilizer legs 516 to the frame of the construction vehicle, for example as shown in FIGS. 6 and 7.

The example method of assembling a construction vehicle 500 may include providing telescoping cylinders 520, which may include providing a first telescoping cylinder and providing a second telescoping cylinder. The method 500 may include connecting the telescoping cylinders 522 which may include connecting the first telescoping cylinder to the first stabilizer leg and connecting the second telescoping cylinder to the second stabilizer leg. The manner of connecting the telescoping cylinder is shown by way of example, but may be connected in other manners to allow for the telescoping action of the stabilizer leg.

The example method of assembling a construction vehicle 500 may include providing and supporting a controller 524 on the frame. the method 500 may include providing telescoping circuits 526 which may include providing a first telescoping circuit to operate the first telescoping cylinder to move the first stabilizer leg between a retracted position and an extended position and providing a second telescoping circuit to operate the second telescoping cylinder to move the second stabilizer leg between a retracted position and an extended position. The method 500 may include connecting the telescoping circuits 528 including connecting the first telescoping circuit to the controller and to the first telescoping cylinder, and connecting the second telescoping circuit to the controller and to the second telescoping cylinder.

In some embodiments the first telescoping circuit and the second telescoping circuit are independent and can be operated independently to move the construction vehicle laterally while the first leg distal end and the second leg distal end are engaged with the ground.

In some embodiments the first stabilizer leg, or right side stabilizer leg 201 includes a first leg pivot end 205, and the second stabilizer leg, or left side stabilizer leg 202 includes a second leg pivot end 206, for example as shown in FIGS. 6 and 7.

The example method of assembling a construction vehicle 500 may include providing stabilizer cylinders including a first stabilizer cylinder and a second stabilizer cylinder. The method may include connecting the first stabilizer cylinder between the frame and the first stabilizer leg to allow the first stabilizer leg to pivot at the first leg pivot end, and connecting the second stabilizer cylinder between the frame and the second stabilizer leg to allow the second stabilizer leg to pivot at the second leg pivot end, for example as shown in FIGS. 6 and 7.

In some embodiments the telescoping cylinders include hydraulic telescoping cylinders. In some embodiments the telescoping cylinders include electric actuator telescoping cylinders as the telescoping cylinders.

Although Applicant has described Applicant's preferred embodiments of this invention, it will be understood that the broadest scope of this invention includes modifications and implementations apparent to those skilled in the art after reading the above specification and the below claims. Such scope is limited only by the below claims as read in connection with the above specification. Further, many other advantages of Applicant's invention will be apparent to those skilled in the art from the above descriptions and the below claims.

The invention claimed is:

1. A method of operating a pair of stabilizer legs of a construction vehicle, the construction vehicle having a frame, a controller, and an earth moving tool, each pair of stabilizer legs comprising:
   a first member coupled to the frame at a pivot joint;
   a first actuator coupled to the frame and to the first member;
   a second member extending from the first member to a leg distal end; and
   a second actuator coupled to the first member and to the second member;
the method comprising:
   activating the first actuator, by the controller, to move the first member from a stowage position above the pivot joint to a stabilization position below the pivot joint;
   activating the second actuator, by the controller, to telescope the second member with respect to the first member between a retracted position and an extended position.

2. The method of claim 1 wherein the method further comprises:
   activating the first actuator, by the controller, to move the first member from a stabilization position below the pivot joint to a stowage position above the pivot joint; and
   activating the second actuator, by the controller, to telescope the second member with respect to the first member between an extended position and a retracted position.

3. The method according to claim 1, wherein the pair of stabilizer legs are pivotally connected to the frame on substantially opposing sides of the earth moving tool.

4. The method of claim 1 further comprising:
   controlling, by the controller, the pair of stabilizer legs by extending and retracting one of the pair of stabilizer legs independently of the other of the pair of stabilizer legs.

5. The method of claim 1 wherein the first and second actuators are hydraulic cylinders.

6. The method of claim 1 wherein the first and second actuators are electric actuator cylinders.

7. The method of claim 1 wherein the first and second actuators are pneumatic cylinders.

8. The method of claim 1 wherein the method further includes:
   moving the construction vehicle laterally, by the controller, while the leg distal ends of the pair of stabilizer legs are engaged with the ground.

9. A method of assembling a construction vehicle comprising:
   providing a frame for the construction vehicle;
   providing an earth moving tool for the construction vehicle;
   connecting the earth moving tool to the frame;
   providing a controller;
   supporting the controller on the frame;
   providing first and second stabilizer legs, each stabilizer leg including:
      a first member coupled to the frame at a pivot joint;
      a first actuator coupled to the frame and to the first member;
      a second member extending from the first member to a leg distal end; and
      a second actuator coupled to the first member and to the second member;
   supporting the first and second stabilizer legs on the frame;
   providing a first actuating circuit to operate the first actuator of the first stabilizer leg to move the first member from a stowage position above the pivot joint to a stabilization position below the pivot joint;
   providing a second actuating circuit to operate the first actuator of the second stabilizer leg to move the first member from a stowage position above the pivot joint to a stabilization position below the pivot joint;
   providing a third actuating circuit to telescope the second member of the first stabilizer leg with respect to the first member between a retracted position and an extended position;
   providing a fourth actuating circuit to telescope the second member of the second stabilizer leg with respect to the first member between a retracted position and an extended position;
   wherein the first, second, third, and fourth actuating circuits are independent and can be operated independently to move the construction vehicle laterally while the leg distal end of the first stabilizer leg and the leg distal end of the second stabilizer leg are engaged with the ground.

10. The method of claim 9 wherein the first and second actuators are pneumatic cylinders.

11. The method of claim 9 wherein the first and second actuators are hydraulic cylinders.

12. The method of claim 9 wherein the first and second actuators are electric actuator cylinders.

13. A construction vehicle stabilizing system, the construction vehicle having a frame with a tractor mounted on the frame, the system comprising:
   a first stabilizer leg having a first member coupled to the frame at a pivot joint and a second member extending from the first member to a ground-engaging shoe;
   wherein the second member is configured with a telescopic movement with respect to the first member between a retracted position and an extended position, whereby the retracted position locates the ground-engaging shoe closer to the frame and the extended position locates the ground-engaging shoe further from the frame;
   a first actuator coupled to the frame and to the first member;
   a second actuator coupled to the first member and to the second member to power the telescopic movement of the second member between the retracted position and the extended position;
   an earth moving tool attached to the frame, wherein the first stabilizer leg is adapted to overcome the forces of the earth moving tool during excavation;
   a first actuating circuit attached to the construction vehicle, to control the first actuator to move the first member from a stowage position above the pivot joint to a stabilization position below the pivot joint; and a second actuating circuit attached to the construction vehicle, to control the second actuator to extend and to retract the ground-engaging shoe.

14. The construction vehicle of claim 13, further including a second stabilizer leg positioned oppositely the earth moving tool, the second stabilizer leg having a first member coupled to the frame at a pivot joint and a second member extending from the first member to a ground-engaging shoe; a first actuator coupled to the frame and to the first member; and a second actuator coupled to the first member and to the second member to power the telescopic movement of the second member between a retracted position and an extended position.

15. The construction vehicle of claim 14 further comprising: a third actuating circuit attached to the construction vehicle, to control the first actuator to move the first member from a stabilization position below the pivot joint to a stowage position above the pivot joint.

16. The construction vehicle of claim 13, wherein the first and second actuators are electric actuator cylinders.

17. The construction vehicle of claim 13, wherein the first and second actuators are hydraulic cylinders.

18. The construction vehicle of claim 13, wherein the first and second actuators are pneumatic cylinders.

19. The construction vehicle of claim 14 wherein the first and second actuators of the first and second stabilizer legs are operable independently of the other actuators.

20. The construction vehicle of claim 14 wherein the system is configured to shift the construction vehicle laterally towards the ground-engaging shoe, when the ground-engaging shoe is engaged with the ground, thereby allowing substantially lateral movement of the construction vehicle while the stabilizer legs are engaged with the ground.

* * * * *